W. J. HILLIARD.
FRICTION CLUTCH.
APPLICATION FILED DEC. 3, 1910. RENEWED MAR. 30, 1912.
1,035,346.
Patented Aug. 13, 1912.
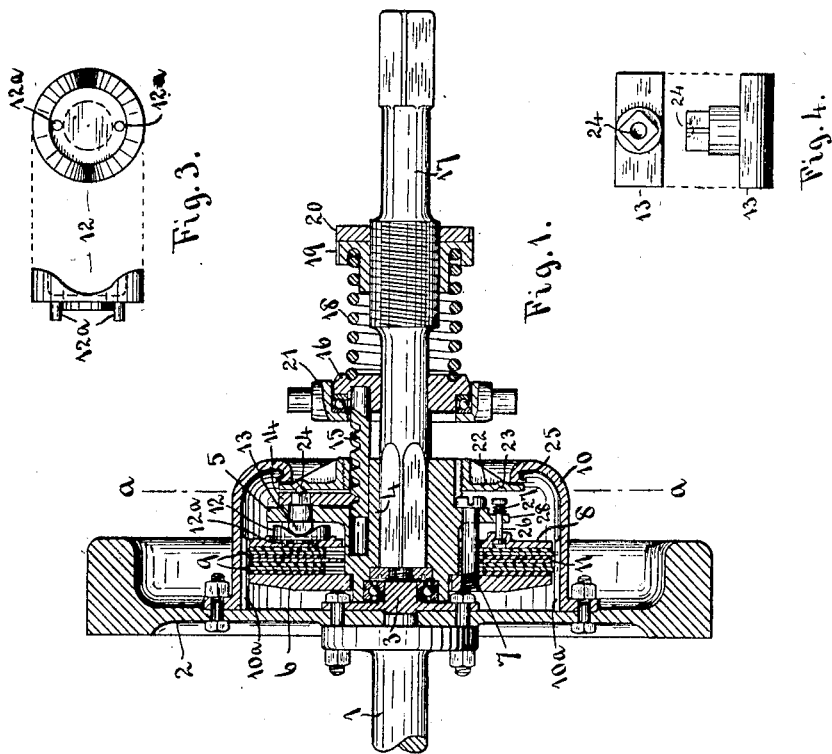
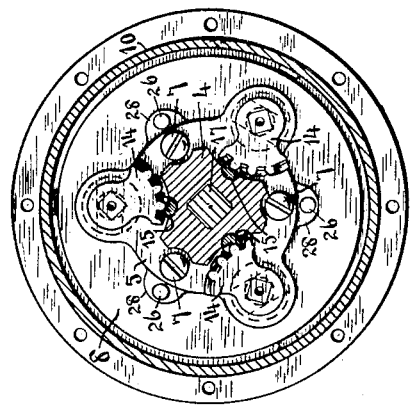
WITNESSES:
M. E. Verbeck.
A. S. Diven.
INVENTOR
William J. Hilliard
BY
Eugene Diven
ATTORNEY

UNITED STATES PATENT OFFICE.

WILLIAM J. HILLIARD, OF ELMIRA, NEW YORK, ASSIGNOR TO CHARLES H. KNIPP, OF ELMIRA, NEW YORK.

FRICTION-CLUTCH.

1,035,346.   Specification of Letters Patent.   Patented Aug. 13, 1912.

Application filed December 3, 1910, Serial No. 595,452.   Renewed March 30, 1912.   Serial No. 687,525.

*To all whom it may concern:*

Be it known that I, WILLIAM J. HILLIARD, a citizen of the United States, residing at Elmira, in the county of Chemung and State of New York, have invented certain new and useful Improvements in Friction-Clutches, of which the following is a specification.

This invention relates to improvements in friction clutches of the disk type; and my object is to provide a clutch of this nature which will be particularly adapted for automobile use, and which can be quickly and positively set and released with the smallest possible movement of the shifting sleeve; and, further, to provide means for quickly and uniformly taking up the wear on the working parts.

I attain my objects by constructing the clutch in the manner illustrated in the accompanying drawings, in which:—

Figure 1 presents a longitudinal section through the center of the clutch; Fig. 2, a transverse section on the line $a$—$a$ in Fig. 1: and Figs. 3 and 4, details of the setting up mechanism.

Like numerals designate like parts in the several views.

To an engine shaft 1 and a fly wheel 2, fastened together in any of the usual ways, I attach a stub shaft 3, which in the illustration is shown as flanged and bolted in place with the same bolts by which the fly wheel and shaft are fastened together. Upon this stub shaft the inner end of the hub 4 is mounted to rotate on ball bearings; and the hub is provided at 5 with a flange, which, as herein shown, is provided, to avoid unnecessary weight, with three extensions in which are formed bearings for the clutch operating mechanism. A disk 6 is mounted at the inward end of the hub, and is drawn against a shoulder thereon by means of the bolts 7, which pass through holes provided therefor in the flange 5; the disk being thus fastened to the hub at a fixed distance from the flange 5, so as to rotate therewith. An outside friction disk 8 is slidably mounted upon the hub, and is rotated therewith by reason of its engagement with the bolts 7. Between the disks 6 and 8 one or more friction rings 9 are inserted, said rings being in sliding engagement with splines 10ª on the inside of a shell 10 fastened to the fly wheel. As illustrated, I have shown two of these friction rings, provided with suitable friction faces, in which case there must also be employed an intermediate disk 11, which is engaged by the bolts 7, to rotate with the hub. The disk 8 is provided with studs 26 which pass through brackets 28 on the flange 5, springs 27 being inserted between the heads of the studs and the brackets to draw the disk outward when the clutch is released.

Upon the outward face of the disks 8, cylindrical cam blocks 12 are placed at suitable intervals apart, being fastened against rotation by pins 12ª or other suitable means. Preferably there will be three of these cams placed at angles of 120° apart, the centers of the cams being set at equal radial distances from the center of the hub. A cross bar 13, having a rounded face to engage a cam 12, is mounted to turn in bearings on each of the projections from the flange 5; said cross bars being provided with short arbors, which extend through said bearings and are provided with squared projecting ends upon which are fastened spiral gear segments 14, said segments being in mesh with longitudinally movable rack bars 15, cut with corresponding teeth. These rack bars are carried by a shifting sleeve 16, mounted upon a shaft 17, by which connection is made to the transmission gear of the vehicle in the usual manner. A stiff spring 18 presses against the sleeve 16 to force the rack bars inward, said spring being held at its outward end by an adjustable collar 19 on the screw threaded portion of the shaft 17, and said collar being secured in adjustment by a lock nut 20. The shifting sleeve is provided with a trunnion ring 21, which is to be coupled to a foot lever in the usual manner.

As illustrated in Fig. 1, the parts of the clutch are shown in released position. When the clutch is to be set, the pressure of the foot lever on the ring 21 will be released, thereby permitting the spring 18 to force the sleeve 16 and rack bars inward. This movement of the rack bars imparts partial rotation to the gear segments 14, thereby turning the cross bars 13 and causing them to ride outward on the cams 12, which forces the cams, and with them the ring 8, inward to press the friction disks and rings into clutching engagement. When the pressure is again applied to the ring 21, to move the sleeve outward against the spring tension, the cross bars 13 are turned back, thereby permitting the disk 8 to move outward and release the clutch parts. As wear takes place between the friction disks and rings, the lost motion between the cross bars 13 and cams 12 will be taken up by means of a disk 22, which is screw threaded upon the outward end of the hub 4. This disk is provided with an annular groove 23, the radius of which corresponds with the radius of the centers of the arbors on the cross bars, and the outward ends of these arbors are provided with hemispherical sockets 24, in each of which a ball is placed to engage the groove on the disk 12. This also forms a thrust bearing for each arbor and prevents friction between the cross bar and the inward face of the flange 5. When wear takes place the disk will be screwed inwardly sufficient to take up the wear; this inward movement of the disk being transmitted simultaneously and to equal degree to each of the cross bars 13. Any suitable means for locking the disk in adjusted position may be employed.

As herein shown, the shell 10 is inwardly flanged on its outward side, so as to overlap the outer edge of the disk 22, thus inclosing the clutch parts, and forming a dust guard therefor. In addition, I provide this part of the shell with an inturned flange having an inside groove 25, by which the oil contained in the shell, when thrown outward by centrifugal force, will be caught and prevented from passing outward through the joint between the casing and the disk, when the clutch is brought to rest; the oil so caught being returned to the shell. The casing is removably attached to the fly wheel, as shown, to permit of the assembling of the parts, and to permit the shell to be removed for repairs to the clutch.

What I claim as my invention and desire to secure by Letters Patent is—

1. In a friction clutch, the combination with one or more friction rings, of inside and outside gripping members, a plurality of cylindrical cams fastened upon the outward side of the outside member, cross-bars engaging said cams and revolubly mounted on the hub of the clutch, and means for turning said cross-bars.

2. In a friction clutch, the combination with one or more friction rings, of inside and outside gripping members, a plurality of cylindrical cams fastened upon the outward side of the outside member, cross-bars engaging said cams and having arbors revolubly mounted on the hub of the clutch, segmental spirally cut gears on said arbors, and a shifting sleeve provided with rack bars in mesh with said gears.

3. In a friction clutch, the combination with one or more friction rings, of inside and outside gripping members, a hub upon which the inside member is fixed and upon which the outside member is slidably mounted, a plurality of cylindrical cams fastened upon the outward side of the outside member, cross-bars engaging said cams and having arbors journaled in a flange on the hub, a shifting sleeve, and means for imparting forward and back rotative movement to the arbors from the sleeve.

4. In a friction clutch, the combination with one or more friction rings, of inside and outside gripping members, a hub upon which the inside member is fixed and upon which the outside member is slidably mounted, a flange on the hub, a plurality of setting up devices between the flange and the outside member, each comprising a cam part and a cam engaging part, one of which parts is fastened upon said member and the other revolubly mounted in the flange, a shifting sleeve, and means for imparting forward and back rotative movement to the revoluble parts from the sleeve.

5. In a friction clutch, the combination with one or more friction rings, of inside and outside gripping members, a hub upon which the one member is fixed and the other slidably mounted, a flange on the hub, a plurality of setting up devices between the flange and the outside member, each comprising a cam part and a cam engaging part, one of which parts is fastened upon said member and the other provided with an arbor journaled in the flange, thrust bearings between the hub and the outward ends of said arbors, a shifting sleeve, and means for imparting forward and back rotative movement to the arbors from the sleeve.

6. In a friction clutch, the combination with one or more friction rings, of inside and outside gripping members, a hub upon which the one member is fixed and the other slidably mounted, a flange on the hub, a plurality of setting up devices between the flange and the outside member, each comprising a cam and an engaging cross-bar, one of which parts is fastened upon said member and the other provided with an arbor journaled in the flange, a disk adjustably mounted on the hub and provided with an annular groove in its inward face in register with the ends of the arbors, ball bearings between said ends and the groove, a shifting sleeve, and means for imparting forward and back rotative movement to the arbors from the sleeve.

7. In a friction clutch, the combination with the clutch members, of a shell inclosing said members at one side and around their periphery, the open side of the shell being provided with an inturned flange and the rim of the flange being in turn flanged inwardly and provided with an internal annular groove.

In testimony whereof I have affixed my signature, in presence of two witnesses.

WM. J. HILLIARD.

Witnesses:
 Eugene Diven,
 M. E. Verbeck.